United States Patent
Umeda et al.

(10) Patent No.: US 6,311,383 B1
(45) Date of Patent: Nov. 6, 2001

(54) METHOD OF MANUFACTURING ELECTRIC-MACHINE-ROTOR HAVING A FIELD COIL AND PERMANENT MAGNETS

(75) Inventors: Atsushi Umeda, Okazaki; Hitoshi Irie, Nagoya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/175,336

(22) Filed: Oct. 20, 1998

(30) Foreign Application Priority Data

Oct. 22, 1997 (JP) .................................................. 9-289638

(51) Int. Cl.[7] .................................................. H02K 15/00
(52) U.S. Cl. .............................. 29/596; 29/598; 29/592.1; 310/261; 310/263; 310/156
(58) Field of Search ...................... 29/596, 592.1, 29/598; 310/159, 156, 168, 254, 257, 261, 263, 58

(56) References Cited

U.S. PATENT DOCUMENTS

| | | |
|---|---|---|
| 3,271,604 | 9/1966 | Priddy . |
| 4,584,496 * | 4/1986 | Frister .................................. 310/60 R |
| 4,648,004 * | 3/1987 | Richter et al. ........................ 361/143 |
| 4,959,577 * | 9/1990 | Radomski ............................. 310/263 |
| 4,998,034 * | 3/1991 | Hashimoto et al. ................ 310/67 R |
| 5,220,227 * | 6/1993 | Ohi ...................................... 310/156 |
| 5,325,003 * | 6/1994 | Saval et al. ............................. 310/43 |
| 5,382,862 * | 1/1995 | Ward et al. ........................... 310/263 |
| 5,483,116 | 1/1996 | Kusase et al. . |
| 5,492,572 * | 2/1996 | Schroeder et al. .................... 148/103 |
| 5,502,424 | 3/1996 | Kato et al. . |
| 5,536,987 * | 7/1996 | Hayashi et al. ...................... 310/263 |
| 5,543,676 * | 8/1996 | York et al. ............................ 310/263 |
| 5,557,248 * | 9/1996 | Prochazka ............................. 335/284 |
| 5,890,277 * | 4/1999 | Kliman ................................... 29/596 |
| 5,898,252 * | 4/1999 | Tanaka et al. ........................ 310/214 |
| 5,925,964 * | 7/1999 | Kusase et al. ........................ 310/263 |
| 5,955,804 * | 9/1999 | Kusase et al. .......................... 310/59 |
| 6,023,141 * | 2/2000 | Chalupa ................................ 318/439 |

FOREIGN PATENT DOCUMENTS

| | | |
|---|---|---|
| 1551658 | 12/1968 | (FR) . |
| 1556037 | 3/1969 | (FR) . |
| 54-116610 | 9/1979 | (JP) . |
| 57-142165 | 9/1982 | (JP) . |
| 61-85045 | 4/1986 | (JP) . |
| 1-129743 | 5/1989 | (JP) . |
| 11052005A * | 2/1999 | (JP) . |
| 356083257A * | 7/1981 | (JP) ...................................... 318/246 |
| 0 718 959 A2 | 6/1996 | (WO) . |

* cited by examiner

Primary Examiner—Carl J. Arbes
Assistant Examiner—Minh Trinh
(74) Attorney, Agent, or Firm—Pillsbury Winthrop LLP (57) ABSTRACT

An electric-machine rotor is composed of a field coil, a pair of pole cores having a plurality of claw poles to enclose the field coil, a plurality of auxiliary permanent magnets disposed between the claw poles, a shaft fixed to the pair of pole cores, and a pair of slip rings connected to the field coil. The rotor is provided with a pattern on a surface of the pole cores for indicating the polarity of the claw poles when the field coil is energized.

12 Claims, 8 Drawing Sheets

METHOD OF MANUFACTURING ELECTRIC-MACHINE-ROTOR HAVING A FIELD COIL AND PERMANENT MAGNETS

CROSS REFERENCE TO RELATED APPLICATION

The present application is based on and claims priority from Japanese Patent Application No. Hei 9-289638 filed on Oct. 22, 1997, the contents of which are incorporated herein by reference.

BACKGROUND OF THE INVENTION

1. Field of the Invention

The present invention relates to an electric-machine-rotor and a method of manufacturing such a rotor.

2. Description of the Related Art

In a rotor having a field coil and no auxiliary permanent magnets, a difference in the magnetic polarity of the claw poles does not cause any problem due to change in the winding direction of the field coil, the position of wire-ends thereof extending from a bobbin, or connection of the wire-ends and slip rings.

As disclosed in JP-A-7-123644, there is a rotor that has auxiliary permanent magnets between claw poles of a pair of pole cores to increase effective magnetic flux and output power. It is necessary for this kind of rotor that the permanent magnets polarize the claw poles in the same polarity as the field coil does when it is energized. Otherwise, sufficient output power can not be generated.

SUMMARY OF THE INVENTION

The present invention is to provide an improved electric-machine-rotor having a field coil and auxiliary permanent magnets that can provide proper magnetic polarity to assure sufficient output power and a method of manufacturing such a rotor.

According to a main feature of the invention, an electric-machine rotor comprising a field coil, a pair of pole cores each having a plurality of claw poles extending alternately from one pole core to the other, a plurality of auxiliary permanent magnets disposed between the claw poles, a pair of slip rings connected to the field coil, and means for indicating proper polarity of the claw poles to be magnetized. Therefore, the permanent magnets can be magnetized properly and easily according to the indication.

The means may be a pair of wire-ends extending from the field coil differently from each other.

According to another feature of the invention, an improved method of manufacturing is applied to an electric-machine rotor composed of a field coil, a pair of pole cores having a plurality of claw poles extending alternately from one pole core to the other, a plurality of auxiliary permanent magnets disposed between the claw poles, and a pair of slip rings connected to the field coil. The method is composed of the steps of forming a pattern on the pole cores to indicate proper polarity of the claw poles and magnetizing the plurality of permanent magnets according to the pattern.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A rotor according to a first embodiment of the invention is described with reference to FIGS. 1–5.

Figure 1:
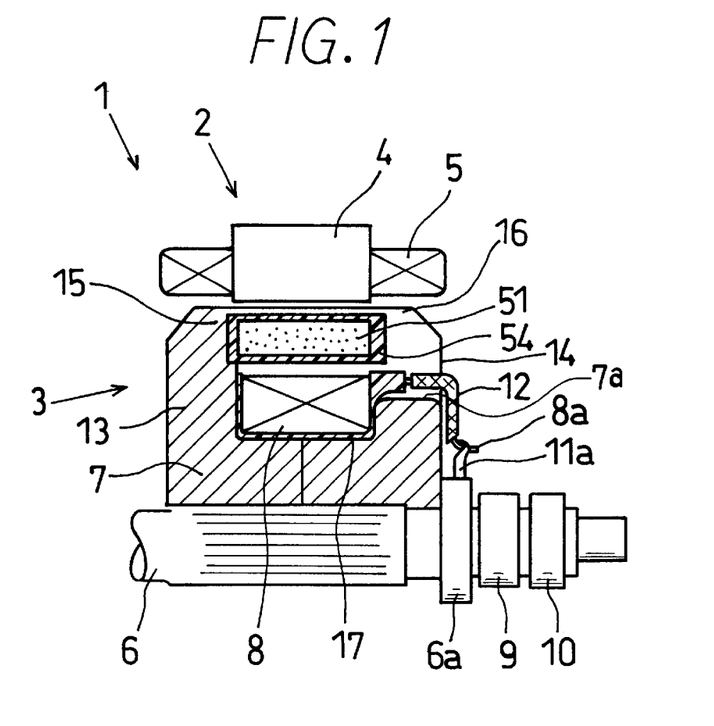
FIG. 1 is a longitudinal cross-sectional view illustrating a rotor according to a first embodiment of the invention.

Alternator 1 has stator 2 and rotor 3. Stator 2 is supported by a frame (not shown) and composed of stator core 4 and stator coils 5. Stator core 4 is composed of laminated cylindrical sheets having a plurality of slots (not shown) on the inner periphery thereof. There are three stator coils 5 inserted in the slots to generate three-phase ac voltage when rotor 3 rotates.

Figure 2:
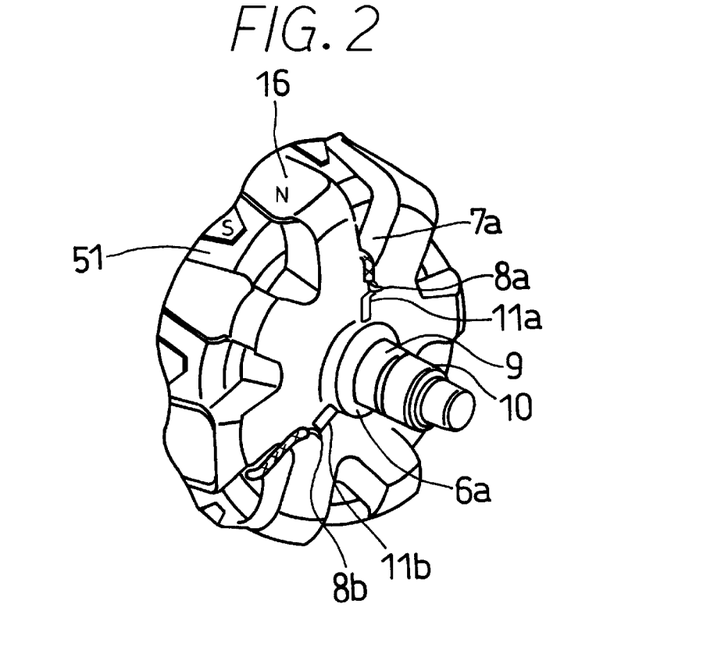
FIG. 2 is a fragmentary perspective view illustrating the rotor illustrated in FIG. 1.
Figure 5:
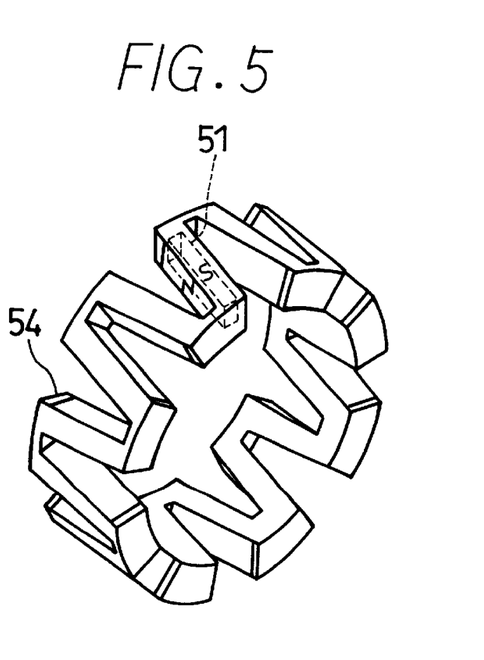
FIG. 5 is a perspective view illustrating a magnet holder and permanent magnets of the rotor illustrated in FIG. 1.

Rotor 3 has shaft 6 press-fitted thereto, a pair of pole cores 7, field coil 8 and a pair of slip rings 9, 10. The pair of slip rings 9, 10 and a pair of wire-ends 8a, 8b of field coil 8 are respectively soldered to and connected by a pair of connection bars 11a, 11b, which are made from copper. Wire-ends 8a, 8b of field coil 8 are covered by insulating tubes 12 respectively. As shown in FIGS. 2 and 5, rotor 3 has a plurality of permanent magnets 51 held in magnet holder 54.

Shaft 6 is linked to a pulley (not shown) to be driven by an engine (not shown) mounted in an automobile. Reference numeral 6a is a ring-shaped stopper formed on shaft 6 to prevent pole core 7 from shifting in the axial direction.

A pair of pole cores 7 is press-fitted and anchored to shaft 6 to face each other. One of pole cores 7 on the front side (left side in FIG. 1) has desk portion 13 and seven claw poles 15 extending backward from the outer periphery of desk portion 13 and the other of pole cores 7 on the rear side (right side in FIG. 1) desk portion 14 and seven claw poles 16 extending forward from the outer periphery of desk portion 14. Claw poles 15, 16 are disposed on the circumference of rotor 3 alternately at equal intervals.

The pair of slip rings 9, 10 are fixed to an end portion of shaft 6 to supply field current to field coil 8. A pair of brushes (not shown) is disposed to slide on the outer periphery of the pair of slip rings 9, 10 so that battery voltage can be applied to high-voltage side (current-in side) slip ring 9 and ground voltage can be applied to low-voltage side (current-out side) slip ring 10. Thus, pole core 7 is excited by field coil 8 when field coil 8 is energized so that claw poles 15 on the side opposite the slip rings can provide S-pole and claw poles 16 on the slip ring side can provide N-pole.

Figure 3:
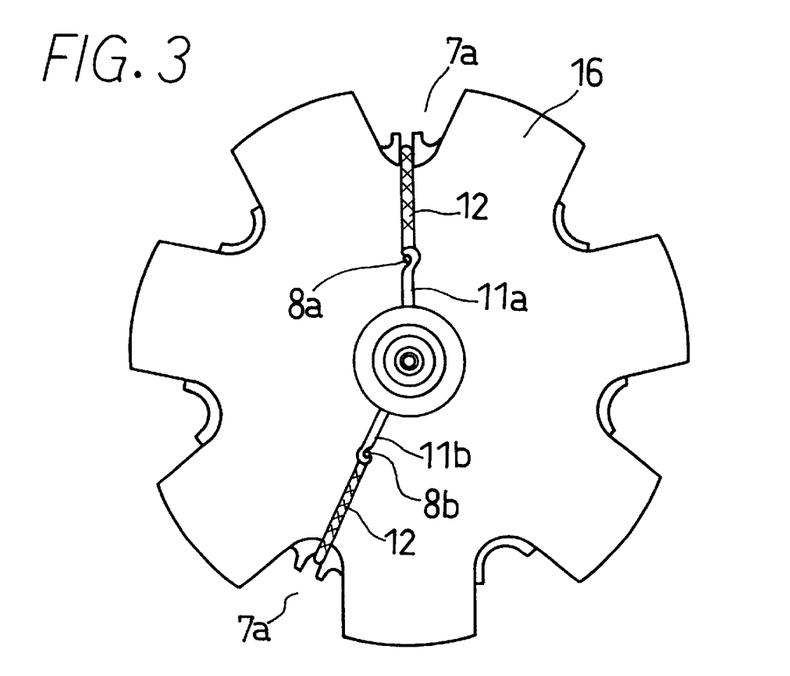
FIG. 3 is a side view illustrating the rear side of the rotor illustrated in FIG. 1.

As shown in FIG. 3, each of the pair of wire-ends 8a, 8b of field coil 8 extends from the bottom of one of saddle portions 7a between neighboring claw poles 16. The number of saddle portions 7a is seven, and wire-end 8a is disposed apart from wire-end 8b clockwise by an angle less than 180 degree, such as 140 degree.

Figure 4:
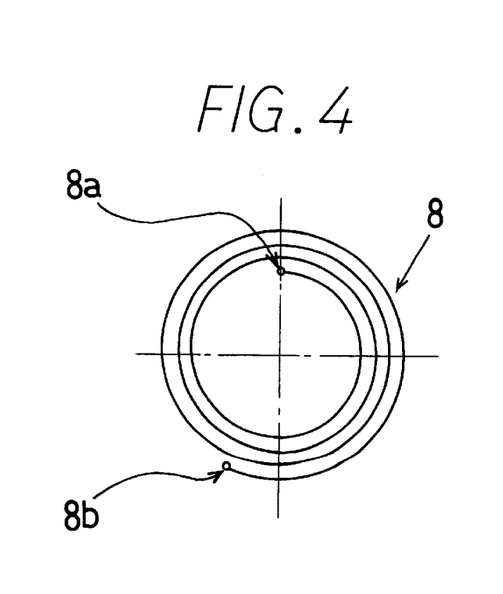
FIG. 4 is a schematic diagram showing a winding pattern of a field coil of the rotor illustrated in FIG. 1.

A winding pattern of field coil 8 is shown in FIG. 4. Field coil 8 is wound around bobbin 17 clockwise so that starting wire-end 8a and ending wire-end 8b extend from the same side of bobbin 17.

Connection bar 11a connects current-in side slip ring 9 with starting wire-end 8a, and connection bar 11b connects current-out side slip ring 10 with ending wire-end 8b. Each of wire-ends 8a, 8b extends radially outward in the direction which is the same as a corresponding one of connection bars 11a, 11b. Therefore, wire-end 8a and connection bar 11a become straight, and wire-end 8b and connection bar 11b become straight.

Fourteen permanent magnets 51 are sintered magnets or resin mold magnets made from ferrite magnet material. Permanent magnets 51 are held in magnet holder 54, a sample of which is illustrated in FIG. 5. Each of permanent magnets 51 is disposed between respective two neighboring claw poles 15, 16 in the direction to reduce leakage magnetic flux therebetween. That is, each side of the permanent magnets that faces one of the claw poles is magnetized to have the same polarity as the same one of the claw poles.

The number of claw poles 15 or 16 of one of pole cores 7 is seven, an odd number, and starting wire-end 8a and ending wire-end 8b extend from saddle portions 7a between neighboring claw poles 16. Therefore, starting wire-end 8a and ending wire-end 8b form a pattern asymmetrical with respect to shaft 6.

Thus, one of two claw poles adjacent to starting wire-end 8a closer to ending wire-end 8b than the other can simply indicate the polarity (e.g. N-pole) of claw poles 15 to be polarized by permanent magnets 51. Since connection bars 11a, 11b are aligned with respective wire-ends 8a, 8b, wrong connection, in which connection bars 11a, 11b are not aligned with wire-ends 11a, 11b, can be easily detected.

(Second Embodiment)

Figure 6:
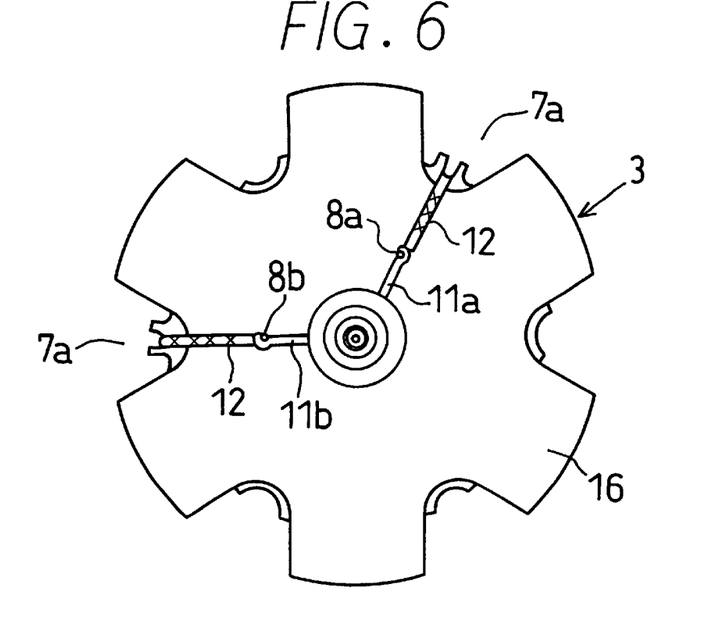
FIG. 6 is a side view illustrating the rear side of a rotor according to a second embodiment of the invention.

A rotor according to a second embodiment of the invention is described with reference to FIG. 6, in which the same reference numerals indicate parts having substantially the same function for reader's convenience.

Rotor 3 has six poles in this embodiment.

Although the number of claw poles 15 or 16 of one of pole cores 7 is six, an even number, in this embodiment, starting wire-end 8a and ending wire-end 8b form a pattern asymmetrical with respect to shaft 6. Therefore, the same effect can be expected as the first embodiment.

(Third Embodiment)

Figure 7:
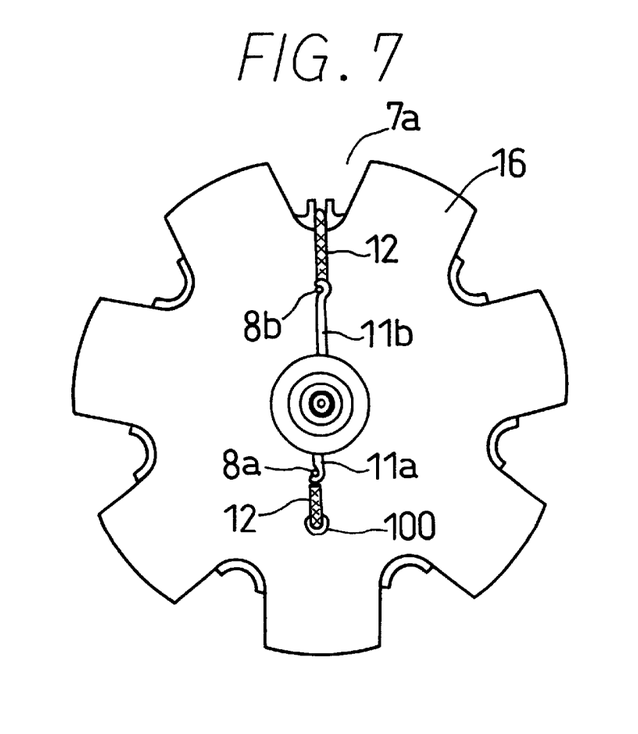
FIG. 7 is a side view illustrating the rear side of a rotor according to a third embodiment of the invention.

A rotor having auxiliary permanent magnets according to a third embodiment is described with reference to FIG. 7. Pole core 7 has through hole 100 for starting wire-end 8a to indicate the proper polarity to be polarized by permanent magnets 51.

Although starting wire-end 8a is disposed at 180 degree in angle from ending wire-end 8b, it is not necessary to wind both or one of wire-ends 8a, 8b excessively. Therefore, wire-ends 8a, 8b can be extended without crossing other winding portions of field coil 8 so that bobbin 17 can be made simple in shape and layer short caused by stress can be prevented.

Starting wire-end 8a is different in length from ending wire-end 8b, and also connection bar 11a is different in length from connection bar 11b. Therefore, wrong connection is not possible.

(Fourth Embodiment)

Figure 8:
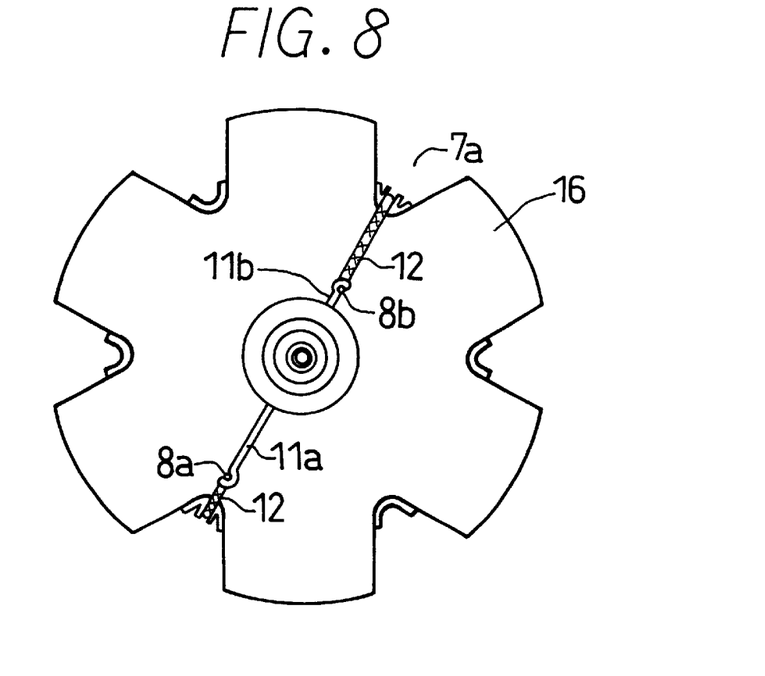
FIG. 8 is a side view illustrating the rear side of a rotor according to a fourth embodiment of the invention.

A rotor according to a fourth embodiment of the invention is described with reference to FIGS. 8–10. Starting wire-end 8a is disposed at 180 degree in angle from ending wire-end 8b, and starting wire-end 8a is different in length from ending wire-end 8b. Thus, the joint portion of starting wire-end 8a and connection bar 11a and the joint portion of ending wire-end 8b and connection bar 11b form a pattern asymmetrical with each shaft 6.

Figure 9:
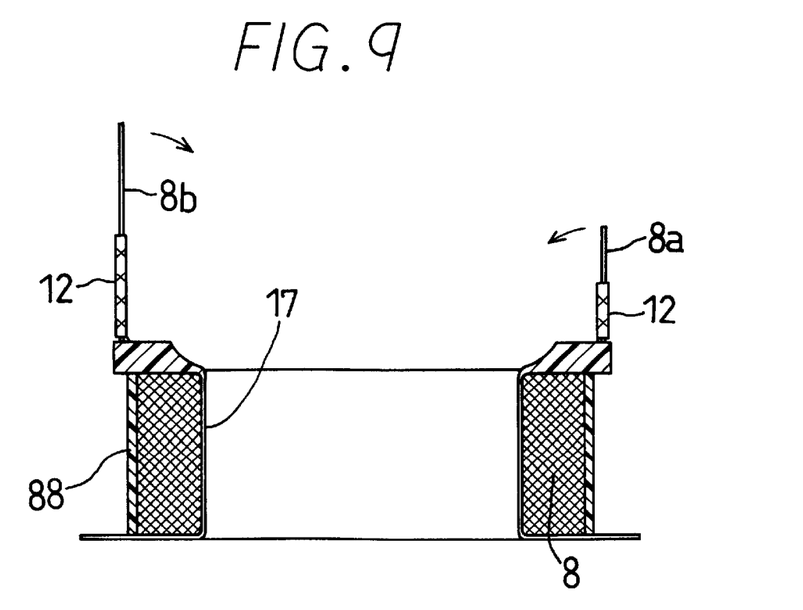
FIG. 9 is a longitudinal cross-sectional view of a field coil of a rotor according to the fourth embodiment.
Figure 10:
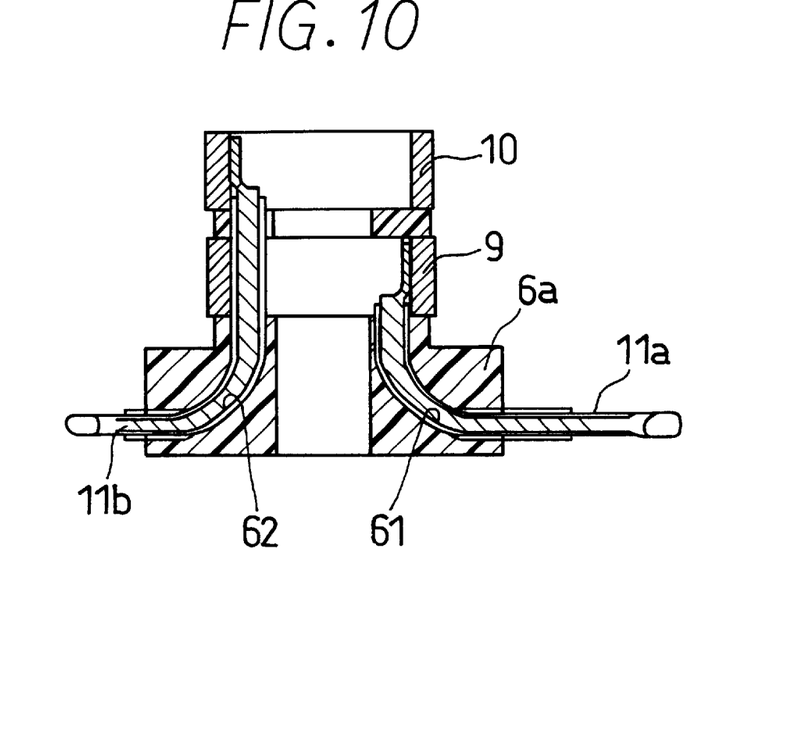
FIG. 10 is a longitudinal cross-sectional view illustrating slip rings and connection bars of the rotor according to the fourth embodiment.

Starting wire-end 8a and ending wire-end 8b before being bent radially inward are illustrated in FIG. 9, and slip rings 9, 10 and connection bars 11a, 11b after connection are illustrated in FIG. 10. In FIG. 10, the pair of slip rings 9, 10 is held by stopper 6a made from resinous material. Stopper 6a has through holes 61, 62 at portions 180 degree in angle shifted from each other, and connection bars 11a, 11b extend outward from through holes 61, 62. One end of connection bar 11a is connected to slip ring 9, and one end of connection bar 11b is connected to slip ring 10. The other ends of connection bars 11a, 11b are located at 180 degree in angle shifted from each other to extend radially outward. Field coil 8 is covered by a piece of insulating tape 88.

Thus, starting wire-end 8a is shorter than ending wire-end 8b, and connection bar 11a is longer than connection bar 11b. Therefore, the polarity of claw poles 15, 16 can be decided easily by setting the starting wire end in a prescribed position of the magnetizing device without addition of any member or step. It is impossible to connect starting wire-end 8a that is shorter than ending wire-end 8b and connection bar 11b that is shorter than connection bar 11a, and wrong connection can be prevented.

Connection bar 11a extends further than connection bar 11b so that both connection bars 11a, 11b can have the same length with the result that the number of parts can be reduced.

(Fifth Embodiment)

Figure 11:
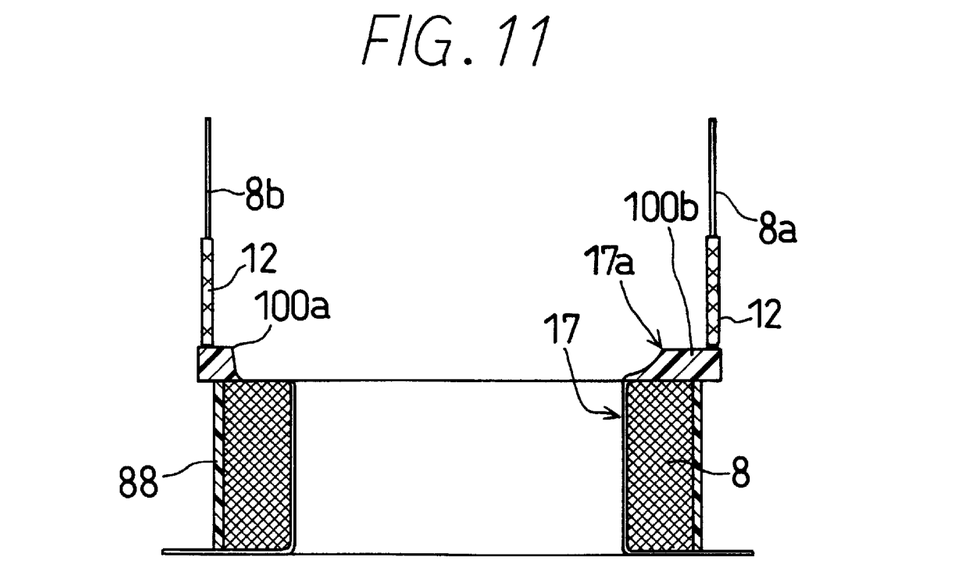
FIG. 11 is a longitudinal cross-sectional view of a field coil of a rotor according to a fifth embodiment of the invention.
Figure 12:
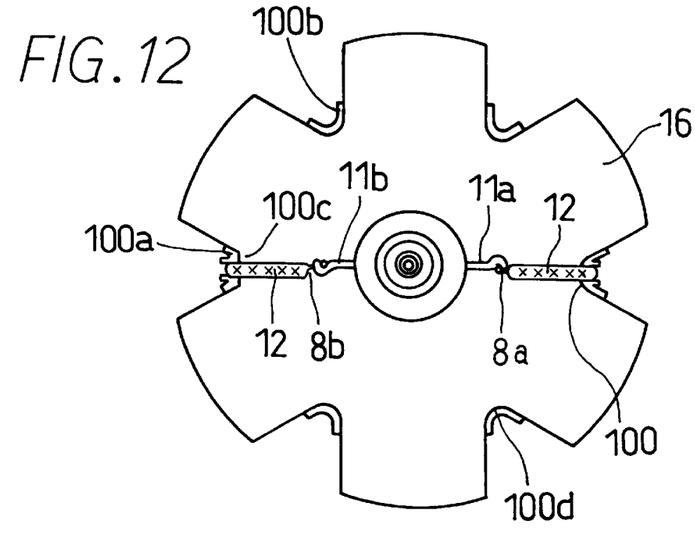
FIG. 12 is a side view illustrating the rear side of the rotor according to the fifth embodiment.

A rotor according to a fifth embodiment of the invention is described with reference to FIGS. 11–12.

Each of pole cores 7 has six claw poles 15 or 16. The joint portion of wire-end 8a and connection bar 11a and the joint portion of wire-end 8b and connection bar 11b are disposed at the same distance from the center of the end surface of slip-ring-side pole core 7. Bobbin 17 has a flange members 17a integrally formed on an end thereof. Flange members 17a has six projections 100a, 100b. Projection 100a is different in shape from five projections 10b. One of six saddle portions 7a has flat bottom 100c, and the other five have concave bottom 100d. The one projection 100a covers flat bottom 100c, and the other five projections 100b cover concave bottoms 100d respectively.

Thus, the bottom shape of saddle portions 16a can tell ending wire-end 8b of field coil 8 to be connected to connection bar 11b, thereby indicating which claw poles to magnetize properly.

(Sixth Embodiment)

Figure 13:
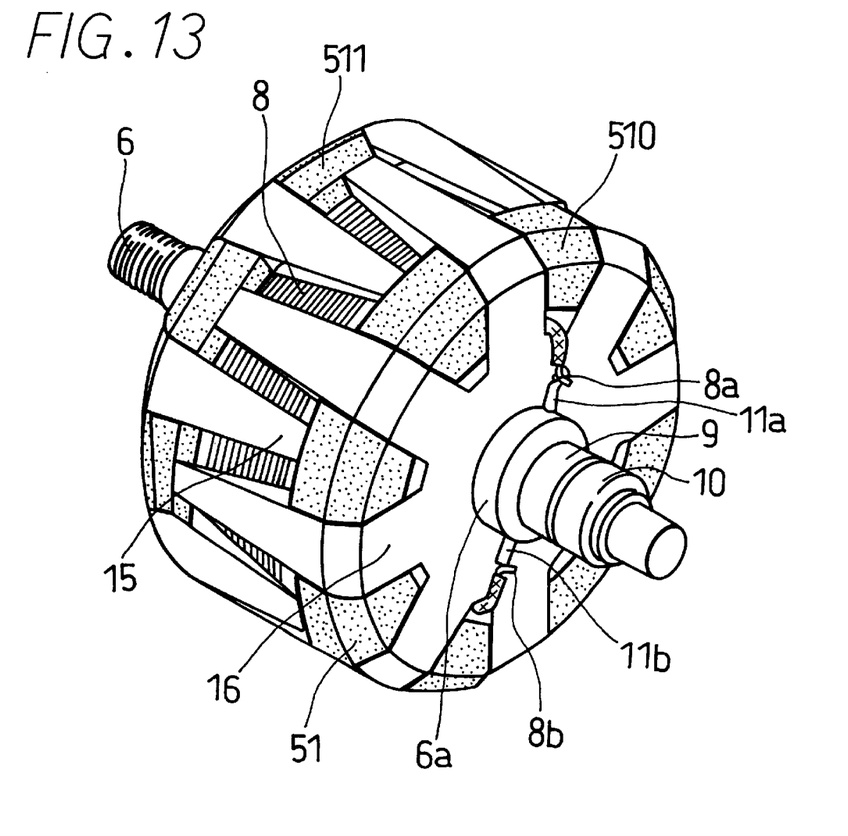
FIG. 13 is a perspective view of a rotor according to a sixth embodiment of the invention.

A rotor according to a sixth embodiment of the invention is described with reference to FIG. 13.

Permanent magnets 510, 511 are ring shaped. Each of permanent magnets 510 is inserted between two neighboring claw poles 16, and each of permanent magnets 511 is inserted between two neighboring claw poles 15. The above described structures can be applied to this type of rotor.

(Seventh Embodiment)

Figure 14:
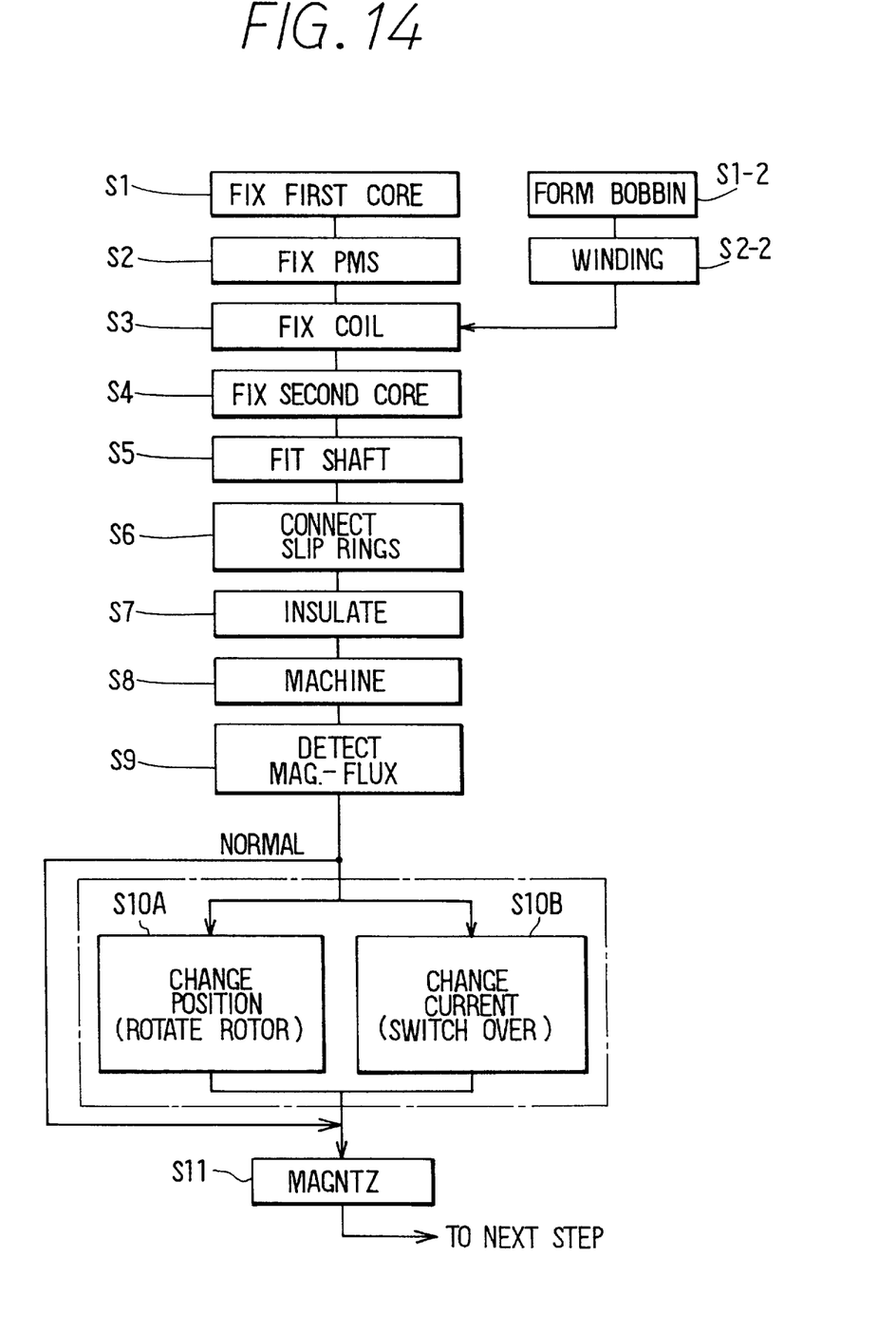
FIG. 14 is a process chart showing manufacturing steps of rotors according to the invention.

A method of manufacturing a rotor according to a seventh embodiment of the invention is described with reference to a flow chart shown in FIG. 14.

When starting wire-end 8a of field coil 8 is found, the direction of the magnetic field generated by field coil can be decided. It is now assumed that the field current is supplied from starting wire-end 8a and that the winding direction of field coil 8 is fixed.

At the beginning, bobbin 17 is formed (S1-2), and field coil 8 is wound around bobbin 17 (S2-2). Then, one (hereinafter referred to as the first pole core) of a pair of pole cores 7 is set on an assembling table (S1), and unmagnetized permanent magnets 51 and field coil 8 are fixed to the first pole core (S2, S3), and then, to another pole core (S4, hereinafter referred to as the second pole core). Subsequently, shaft 6 is fitted into a subassembly composed of pole cores 7, permanent magnets 51 and field coil 8 (S5). Then, slip rings 9, 10 are fitted to shaft 6, and connection bars 11a, 11b extending from slip rings 9, 10 are connected to wire-ends 8a, 8b respectively (S6). In this stage, it is not possible to tell which one of the two wires is starting wire-end 8a, or which one of the connection bars is connected to current-in side slip ring. After the joint portions are insulated (S7), the outer periphery 120 of pole core 7 is machined to form finished unmagnetized rotor 3 (S8).

Thereafter, dc test voltage is applied across slip rings 9, 10 of the unmagnetized rotor 3 to detect the magnetic field by a magnetic field sensor (S9). In this test, a higher voltage is applied to the high-voltage side slip ring 9 so as to detect the polarity of the claw poles 15, 16 in practical use. The above test is carried out after rotor 3 is set in the magnetizing device.

When rotor 3 is set in the magnetizing device, rotor 3 is usually placed at a normal position, or at a position one claw-pole-pitch shifted therefrom. Rotor 3 is rotated by one claw-pole-pitch (S10A) or the magnetizing current direction is changed before the permanent are magnetized (S10B) if it is not placed at the normal position. This step is well-known, and more detailed description is omitted.

Thus, the permanent magnets can be magnetized properly (S11), and manufacturing machines and steps can be simplified.

(Eighth embodiment)

Figure 15:
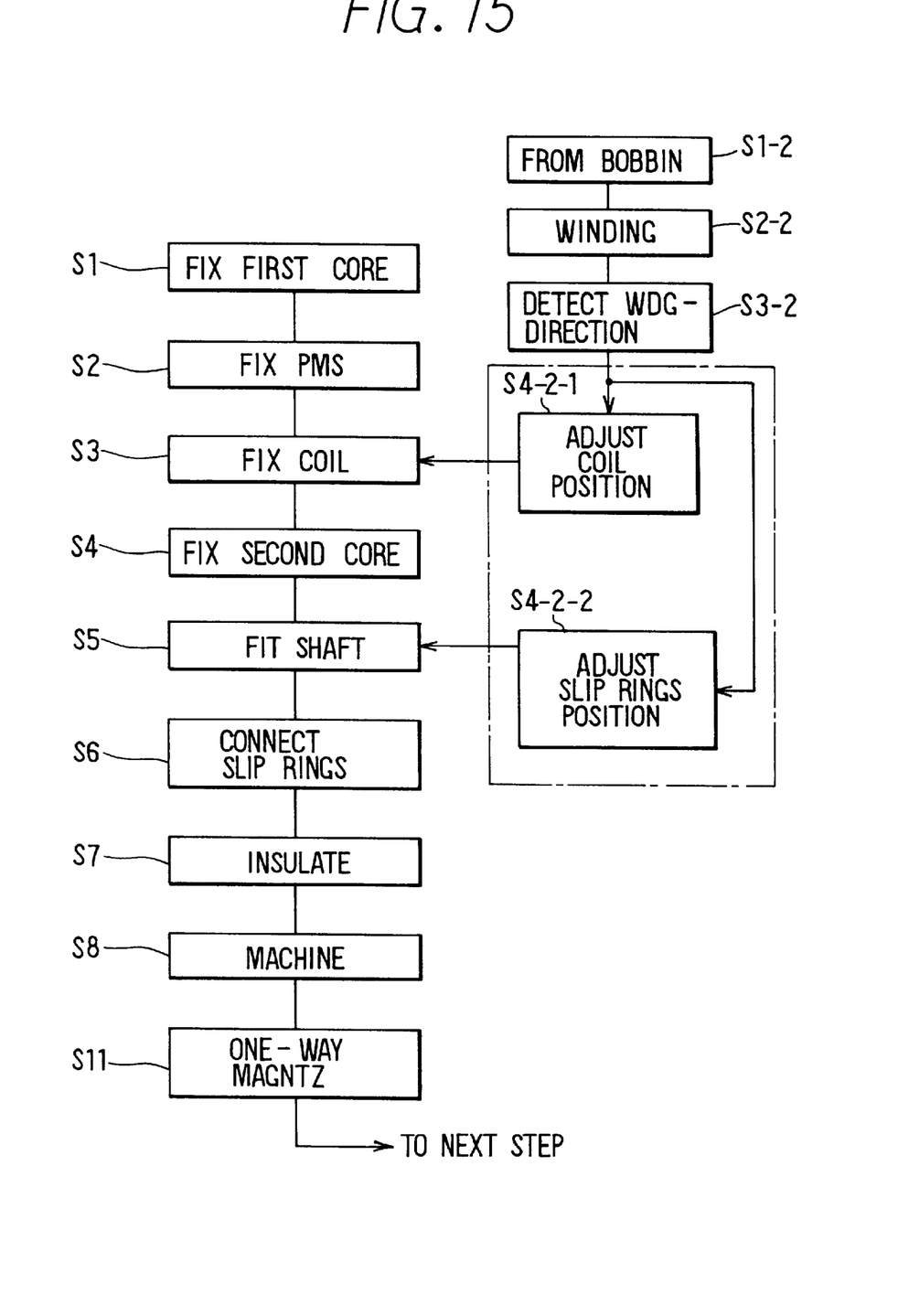
FIG. 15 is a process chart showing manufacturing steps of rotors according to the invention.

Another method of manufacturing the rotor according to the eighth embodiment is described with reference to a flow chart shown in FIG. 15. Rotor 3 has the same means for indication as the first—sixth embodiments. In this embodiment, the test step S9 and step S10A or S10B of the seventh embodiment are omitted, and step S3-2 of detecting winding direction and step S4-2-1 or S4-2-2 of position adjusting are added.

In the step of detecting winding direction (S3-2), starting wire-end 8a is detected.

Then, field coil 8 is fixed to the first pole core and the unmagnetized permanent magnets 51 so that starting wire-end 8a can be positioned at a certain angular position of the first pole core (S4-2-1). If field coil 8 itself indicates starting wire-end 8a, step (S4-2-1) can be omitted.

Subsequently, shaft 6 is fitted into the subassembly composed of slip rings 9, 10, stopper 6a and connection bars 11a, 11b. In this stage, connection bar 11a is aligned with starting wire-end 8a. As described in the first—sixth embodiments, connection bar 11a should be connected to slip ring 9 surely to indicate the polarity.

Thus, only the asymmetrical pattern of connection bar 11a connected with starting wire-end 8a and connection bar 11b connected with ending wire-end 8b can indicate the polarity of claw poles 15, 16 surely.

As a result, the permanent magnets can be magnetized properly whenever rotor 3 is set in the magnetizing device to adjust disposition of claw poles 15, 16, so that manufacturing devices and steps can be simplified.

The wire-ends named here is not only tip ends of the wire but also portions extending from the bobbin or at least portions extending from the pole core to the outside. The electric-machine-rotor and the method of manufacturing the same according to the present invention can be applied to any one of various generators and motors for machines other than vehicle alternators.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A method of manufacturing an electric-machine rotor composed of a field coil having a pair of wire ends, a pair of pole cores each having a plurality of claw poles extending alternately from one pole core to the other to enclose said field coil, a plurality of auxiliary permanent magnets disposed in spaces formed between two of said claw poles, a shaft fixed to said pair of pole cores, and a pair of slip rings connected to said pair of wire-ends, said method comprising:

assembling said field coil, said pair of pole cores, said auxiliary permanent magnets, said shaft, and said pair of slip rings into a unit;

forming a pattern on a portion of said rotor to indicate the polarity of one of said claw poles when said field coil is energized;

machining said unit to form a finished unmagnetized rotor, said pattern formed before said machining step; and subsequently magnetizing said plurality of permanent magnets according to said pattern.

2. The method of manufacturing an electric-machine rotor as claimed in claim 1, wherein said plurality of permanent magnets are magnetized after said rotor is assembled and machined.

3. The method of manufacturing an electric-machine rotor as claimed in claim 1, wherein said magnetizing comprises:

positioning said rotor relative to a magnetic field according to said pattern.

4. The method of an electric-machine rotor as claimed in claim 1, wherein said magnetizing comprises:

setting said rotor at a prescribed position, and supplying said rotor with magnetizing force in the direction according to said pattern detected information.

5. The method of manufacturing an electric-machine rotor as claimed in claim 1, wherein said magnetizing comprises positioning said rotor according to detected information to be magnetized.

6. The method of manufacturing an electric-machine rotor as claimed in claim 1, wherein said magnetizing comprises positioning said rotor in a magnetic field according to said pattern.

7. The method as claimed in claim 1, wherein said pattern is indicated by a position of said pair of wire ends with respect to at least one of said pole cores.

8. The method as claimed in claim 7, wherein said pattern is formed by said pair of wire ends forming at least one angle less than 180 degrees.

9. The method as claimed in claim 8, wherein said pattern is formed by said pair of wire ends extending further toward a rotational axis of said pair of pole cores than the other of said pair of wire ends.

10. A method of manufacturing an electric-machine rotor composed of a field coil having a pair of wire ends, a pair of pole cores each having a plurality of claw poles extending alternately from one pole core to the other to enclose said field coil, a plurality of unmagnetized auxiliary permanent magnets disposed in spaces formed between two of said claw poles, and a shaft fixed to said pair of pole cores, said method comprising:

assembling said field coil, said pair of pole cores, said auxiliary permanent magnets, said shaft into a unit;

forming a pattern on a portion of said rotor to indicate a proper polarity of one of said claw poles to be magnetized;

machining said unit to form finished unmagnetized rotor, said pattern formed before said machining step; and subsequently magnetizing said plurality of permanent magnets according to said pattern so that each side of said permanent magnets facing one of said claw poles can be magnetized to have the same polarity as the same one of said claw poles.

11. The method of manufacturing an electric-machine rotor as claimed in claim 10, wherein said pattern is asymmetrical with respect to said shaft.

12. The method of manufacturing an electric-machine rotor as claimed in claim 10, wherein said magnetizing comprises magnetizing said permanent magnets through said claw poles according to said detected polarity.

* * * * *